(12) United States Patent
Bahnof

(10) Patent No.: US 9,003,979 B2
(45) Date of Patent: Apr. 14, 2015

(54) WORKSTATION

(76) Inventor: Roy Bahnof, Jerusalem (IL)

( * ) Notice: Subject to any disclaimer, the term of this patent is extended or adjusted under 35 U.S.C. 154(b) by 0 days.

(21) Appl. No.: 13/821,982

(22) PCT Filed: Oct. 27, 2011

(86) PCT No.: PCT/IL2011/000828
§ 371 (c)(1),
(2), (4) Date: Mar. 10, 2013

(87) PCT Pub. No.: WO2012/056450
PCT Pub. Date: May 3, 2012

(65) Prior Publication Data
US 2013/0200660 A1  Aug. 8, 2013

Related U.S. Application Data

(60) Provisional application No. 61/407,475, filed on Oct. 28, 2010.

(51) Int. Cl.
| A47B 37/00 | (2006.01) |
|---|---|
| A47C 7/54 | (2006.01) |
| A47B 21/00 | (2006.01) |
| B25H 1/16 | (2006.01) |
| A47B 83/02 | (2006.01) |
| B62B 3/00 | (2006.01) |

(52) U.S. Cl.
CPC . *A47B 21/00* (2013.01); *A47C 7/54* (2013.01); *B25H 1/16* (2013.01); *A47B 83/02* (2013.01); *B62B 3/00* (2013.01)

(58) Field of Classification Search
CPC .......... B25H 1/16; A47B 21/00; A47B 83/02; A47B 23/02; B62B 3/00; A47C 7/54
USPC ......... 297/172, 411.21, 411.4; 108/50.14, 59, 108/64; 280/79.11
See application file for complete search history.

(56) References Cited

U.S. PATENT DOCUMENTS

| 3,477,673 | A | * | 11/1969 | Bereday | 248/121 |
|---|---|---|---|---|---|
| 4,646,655 | A | * | 3/1987 | Robolin | 108/92 |
| 4,863,178 | A | * | 9/1989 | Friesen | 280/32.6 |
| 5,174,223 | A | * | 12/1992 | Nagy et al. | 108/50.01 |
| 5,443,017 | A | | 8/1995 | Wacker et al. | |
| 5,605,311 | A | * | 2/1997 | McGrath et al. | 248/118 |
| 5,704,299 | A | * | 1/1998 | Corpuz et al. | 108/50.01 |
| 5,857,415 | A | * | 1/1999 | Richard | 108/50.01 |
| D407,234 | S | * | 3/1999 | Moen et al. | D6/426 |
| D436,759 | S | * | 1/2001 | Helliwell | D6/474 |
| 6,397,761 | B1 | | 6/2002 | Moore | |
| 6,435,109 | B1 | | 8/2002 | Dell et al. | |

(Continued)

FOREIGN PATENT DOCUMENTS

| DE | 9214286 | 1/1993 |
|---|---|---|
| DE | 29505530 | 6/1995 |

(Continued)

*Primary Examiner* — Milton Nelson, Jr.
(74) *Attorney, Agent, or Firm* — Mark M Friedman

(57) ABSTRACT

The present invention provides a workstation that may be used while performing various tasks, such as working at a computer. The workstation includes a table (2), a waist rest (3), a foot rest (4); a left arm rest and a right arm rest (7). The workstation allows the user to redistribute his body weight from the legs and feet the waist rest, foot rest; and arm rests while in a standing position.

13 Claims, 3 Drawing Sheets

(56) References Cited

U.S. PATENT DOCUMENTS 6,644,748 B2 * 11/2003 Tholkes et al. .......... 297/423.12
2006/0236897 A1 * 10/2006 Pofeldt ........................ 108/27

FOREIGN PATENT DOCUMENTS

| DE | 29504351 | 5/1999 |
| JP | 11187938 | 7/1999 |

* cited by examiner

WORKSTATION

FIELD OF THE INVENTION

This invention relates to workstations for performing various tasks such as working at a computer.

BACKGROUND OF THE INVENTION

Workstations are devices that allow a user to perform various tasks, such as working at a computer, or performing a medical procedure. Ergonometric ally designed workstations strive to allow the user to access equipment positioned at the workstation with maximum ease and comfort.

U.S. Pat. No. 6,435,109 to Dell et al discloses a mobile workstation capable of supporting various types of electrical or diagnostic equipment for use primarily in the health care environment. A work surface is supported by a pedestal and a base. The base includes casters for easy portability of the workstation. The workstation further includes a height adjustment mechanism and a counterbalance. The counterbalance may be supported from the underside of the top of the work surface of the workstation for counterbalancing the weight of the equipment that may be carried on the work surface so as to provide versatility when adjusting the height of the workstation from a seated position to a standing position with minimal effort from the user.

U.S. Pat. No. 5,443,017 to Wacker et al discloses a modular work station that includes a dual column construction with a separately adjustable work surface supported on each column. Each of the columns utilizes a tubular telescoping construction and can provide as many as three individual modes of adjustable movement to the work surface, including lift, tilt, and horizontal back and forth movements. Supporting columns can be selected with varying functions to provide extremely broad versatility. The lift and tilt functions are preferably provided by motor driven linear actuators mounted within the telescoping column with appropriate controls to prevent contact between adjacent work surfaces when one or both of the surfaces is also provided with back and forth sliding movement.

SUMMARY OF THE INVENTION

The present invention provides a workstation that may be used while performing various tasks, such as working at a computer. The workstation of the invention allows performing tasks with reduced body weight on the feet. Reducing body weight from the feet tends to reduce fatigue and injury, and thus increase productivity. The workstation of the invention may be used in any work environment, such as home, office, supermarket, factory production lines, etc.

A standing position tends to reduce back pain, increase upper limb control, allow spontaneous movement of the body, such as shifting body weight from hip to hip, or from one foot to the other. A cashier usually sits in a chair performing shifting movements which are awkward and tiring. A standing position tends to allow greater freedom of movement, with less stress to the upper body as well as the lumbar region.

The invention thus comprises a workstation comprising:
(a) a table;
(b) a waist rest;
(c) a foot rest; and
(d) a left arm rest and a right arm rest.

The workstation of the invention may further comprise a platform beneath the table, waist rest and foot rest. The workstation may then comprise a post extending up from the platform, and any one or more of the table, waist rest, foot rest, and arm rests may be mounted on the post. The post may have a selectable length.

One or more of the table, waist rest, foot rest, and arm rests may be adjustable in both a vertical and horizontal direction.

The table may be provided with an indentation adapted to receive a user's trunk. The left and right armrests may then be positioned laterally to the indentation.

The workstation may further comprise a seat. One or more of the waist rest, the platform and the arm rests may be padded. One or both of the waist rest and the foot rest may have a ring shape.

The workstation may further comprise one or more work surfaces. The workstation may further comprise wheels.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
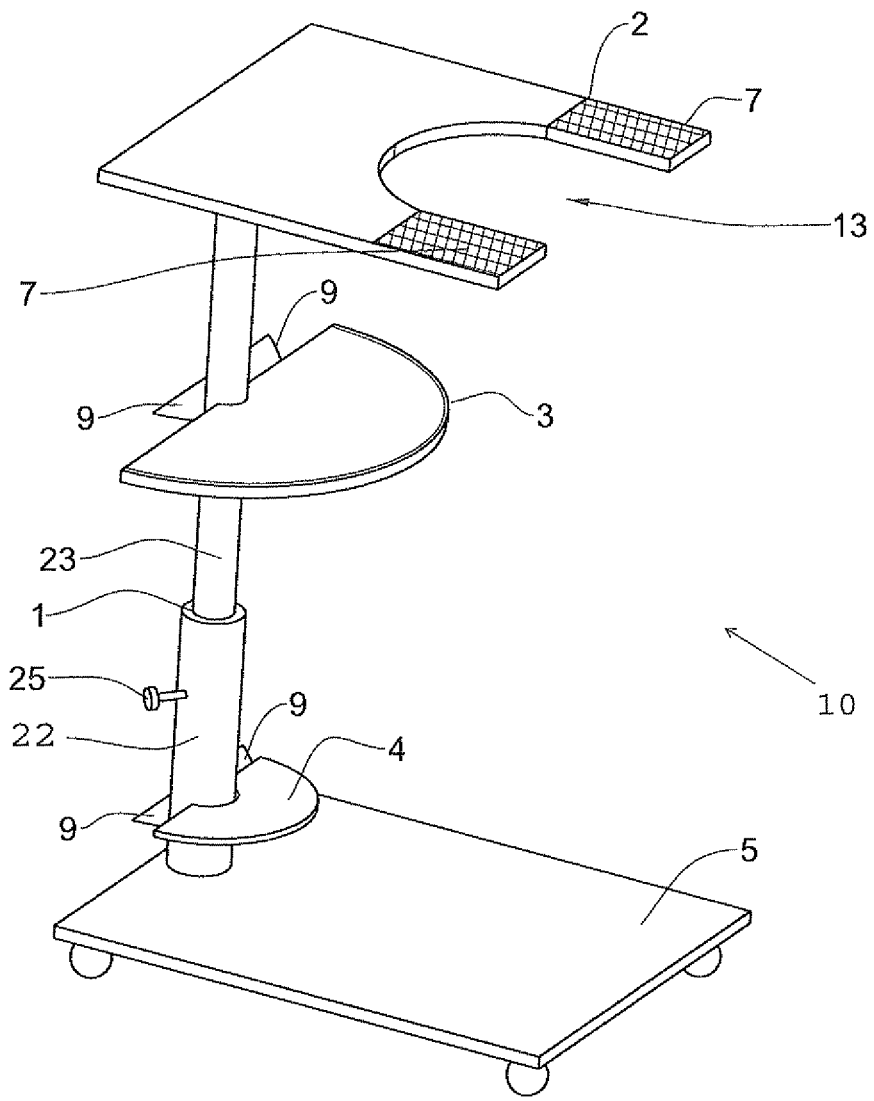
FIG. 1 shows a perspective view of a workstation in accordance with one embodiment of the invention.
Figure 2:
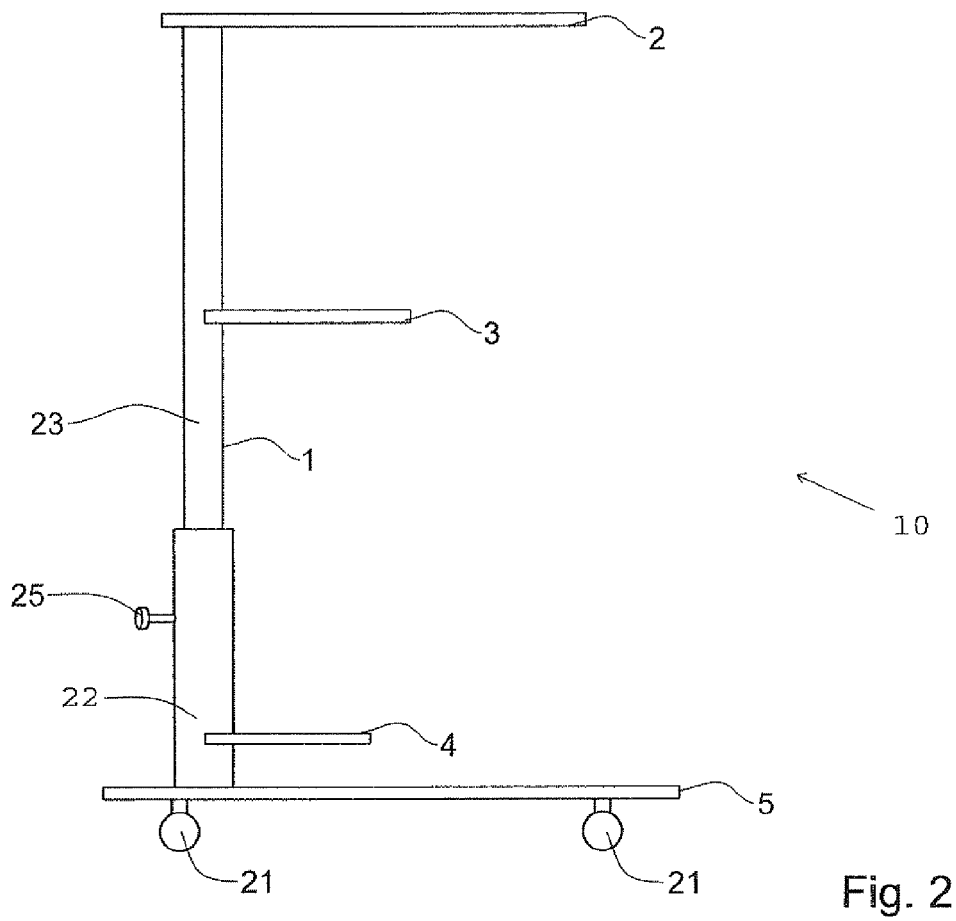
FIG. 2 shows a side view of the workstation of FIG. 1.
Figure 3:
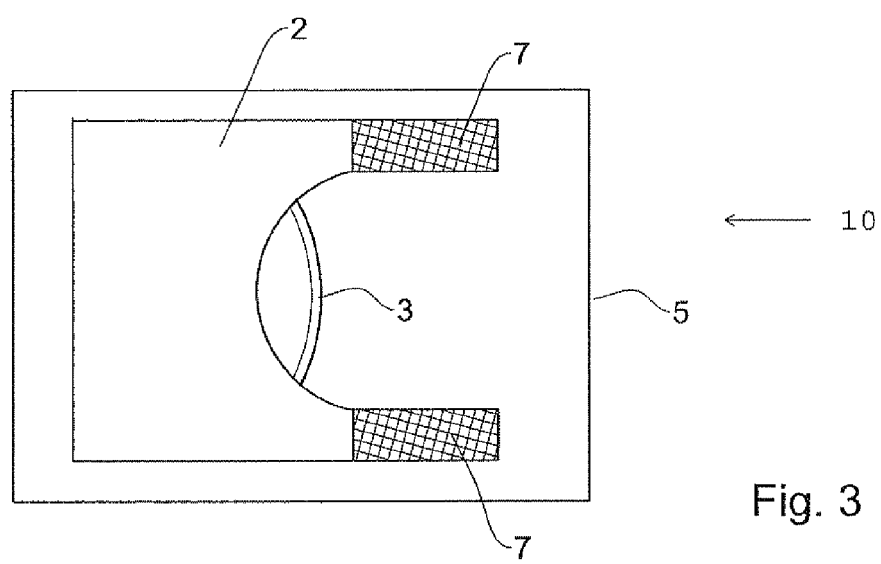
FIG. 3 shows a top view of the workstation of FIG. 1

FIG. 1 shows a perspective view of standing workstation 10 in accordance with one embodiment of the invention. A side view of the workstation 10 is shown in FIG. 2, and a top view is shown in FIG. 3. The work station 10 is a standing workstation that accommodates a user performing a task at the work station while standing. The workstation 10 comprises a platform 5 from which extends a rigid post 1. The platform 5 may be made, for example, from metal or wood, and may be provided with wheels 21 so as to make the workstation 10 mobile. The post 1 has a base portion 22 attached to the platform 5, and an extension portion 23. The bottom of the extension portion 23 is slidable inside the base portion 22. The overall length of the post 1 can be adjusted by locking the extension portion 23 inside the base portion 22 by means of a locking screw 25. Mounted on the top of the post 1 is a table 2. The height of the table 2 above the platform 5 is thus determined by the overlength of the post 1. Mounted on the side of the post 1 are a waist rest 3, and a foot rest 4. The table 2 is provided with integral arm rests 7 indicated by hatching. The postion of one or both of the hip rest 3 and foot rest 4 is preferably adjustable relative to the post 1, in both a vertical and horizontal direction by means of adjustable brackets 9, so that the workstation 10 can be suited to the size of any user.

Figure 4:
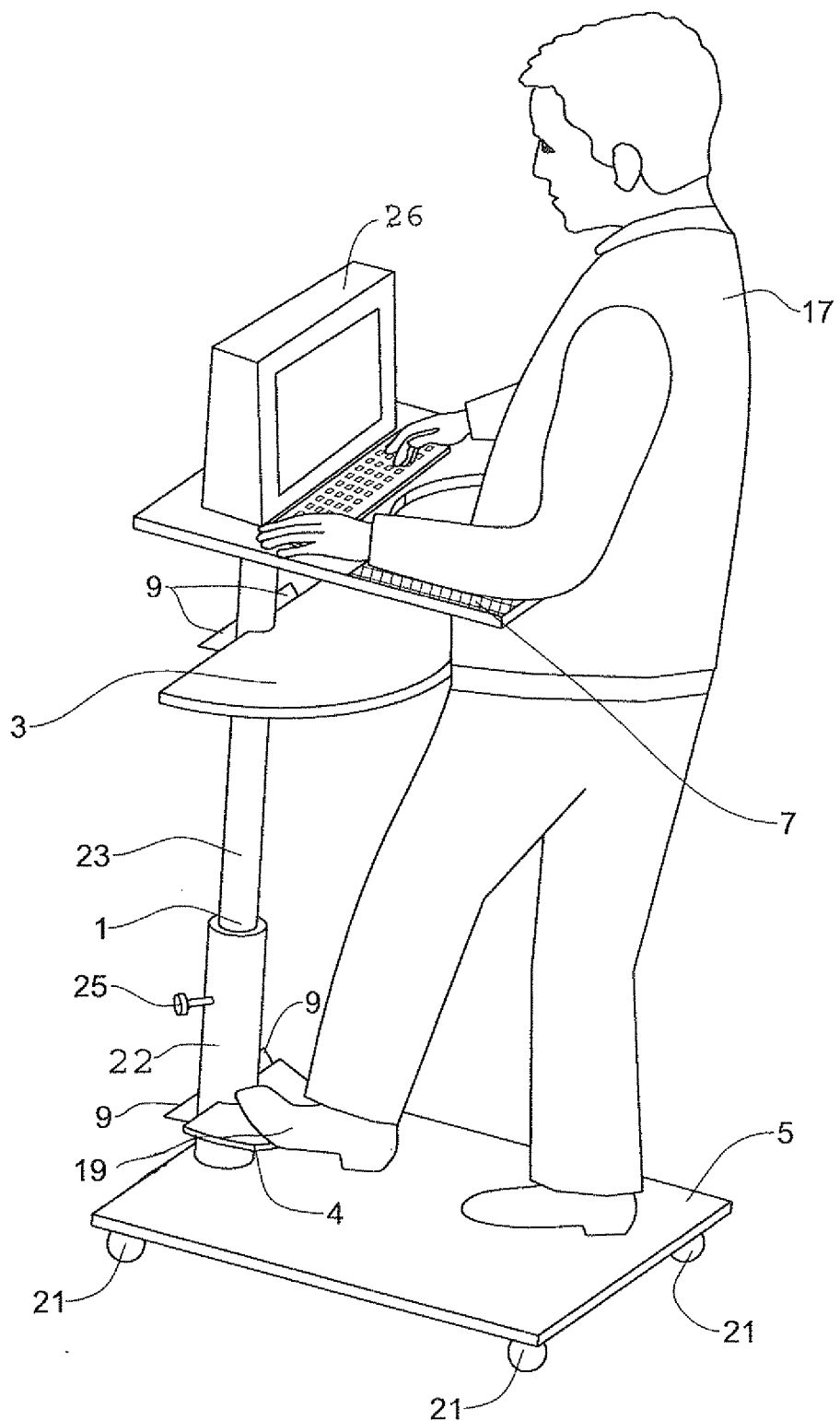
FIG. 4 shows the workstation of FIG. 1 in use by a user.

FIG. 4 shows the workstation 10 in use by a user 17. The platform 5 supports the work station 10 and provides a comfortable working platform upon which the user 17 stands. The table 2 has an indentation 13 in which the user's trunk is postioned. The table 2 supports one or more pieces of equipment such as a computer 26 which the user 17 uses while at the workstation. The user rests his waist on the waist rest 4, places his forearms on the arm rests 7, and places a foot 19 on the foot rest 4. In this way, the user's weight is distributed among the foot rest, waist rest, and arm rests. The arm rests 7 are positioned so that a user standing at the station can rest his forearms on the arm rests 7 with his elbows in line with the user's trunk, and not in front of the trunk. In some embodiments, the arm rests can be adjusted laterally so as to position the arm rests at a distance from the indentation 13 that is suited for the user.

The waist rest 3, arm rests 7, and the platform 5 are preferably padded for the user's comfort. The waist rest 3 and the foot rest 4 may have a ring shape. This is by way of example only, and other shapes such as a rectangular shape or convex, indented surface may also be used.

The workstation 10 may optionally include a seat, and one or more additional work surfaces (not shown).

The workstation allows the user to redistribute 60% to 80% of his body weight from the legs and feet while in a standing position. The inventors have found that distributing the body weight over a relatively large body surface while working tends to reduce damage, stress and pain that occur when the body weight is localized to small body surfaces such as the feet alone or the buttocks alone.

The invention claimed is:

1. A workstation comprising:
   (a) a support structure;
   (b) a work surface mechanically coupled to said support structure;
   (c) a left arm rest and a right arm rest, mechanically coupled to said support structure;
   (d) a waist rest, spaced below said arm rests and mechanically coupled to said support structure, said waist rest relatively positioned to said arm rests so as to enable a user to rest arms on said arm rests while resting a waist of said user on said waist rest, when standing; and
   (e) an adjustment mechanism interposed between said support structure and said waist rest, said adjustment mechanism adapted for adjusting a height of said waist rest relative to said arm rests, said support structure further comprising a platform beneath the waist rest and arm rests, said platform adapted for said user to stand thereon.

2. The workstation according to claim 1, wherein one or more of said work surface, said waist rest, a foot rest, and said arm rests are adjustable in both a vertical and horizontal direction.

3. The workstation according to claim 1 wherein one or both of the waist rest and the arm rests are padded.

4. The workstation according to claim 1 wherein the platform is padded.

5. The workstation according to claim 1, wherein said arm rests are integrated into said work surface.

6. The workstation according to claim 1, further comprising casters under said platform.

7. The workstation of claim 1 wherein said waist rest projects into said standing space as viewed in plain view.

8. The workstation of claim 1, wherein edges of said arm rests and a proximal edge of said work surface together partially defining a standing space for said user, wherein said waist rest projects into said standing space as viewed in plan view.

9. The workstation according to claim 1, wherein said left arm rest and said right arm rest define there-between a standing space for said user, wherein said standing space includes an indention in said work surface adapted to receive a user's trunk.

10. The workstation according to claim 9, wherein the left and right armrests are positioned laterally to the indentation.

11. The workstation according to claim 1, said support structure further comprising a post extending up from the platform.

12. The workstation according to claim 11, wherein the post has an adjustable length.

13. The workstation according to claim 11, wherein any one or more of said work surface, said waist rest, a foot rest, and said arm rests are mounted on the post.

* * * * *